(12) United States Patent
Wang et al.

(10) Patent No.: US 11,897,331 B2
(45) Date of Patent: Feb. 13, 2024

(54) IN-VEHICLE ACOUSTIC MONITORING SYSTEM FOR DRIVER AND PASSENGER

(71) Applicant: Baidu USA LLC, Sunnyvale, CA (US)

(72) Inventors: Wei Wang, Sunnyvale, CA (US); Qi Luo, Sunnyvale, CA (US); Kecheng Xu, Sunnyvale, CA (US); Hongyi Sun, Sunnyvale, CA (US); Wesley Reynolds, Sunnyvale, CA (US); Zejun Lin, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 166 days.

(21) Appl. No.: 17/149,585

(22) Filed: Jan. 14, 2021

(65) Prior Publication Data

US 2022/0219532 A1 Jul. 14, 2022

(51) Int. Cl.
G08B 23/00 (2006.01)
B60K 28/02 (2006.01)
(Continued)

(52) U.S. Cl.
CPC .......... B60K 28/02 (2013.01); B60W 30/182 (2013.01); B60W 50/14 (2013.01);
(Continued)

(58) Field of Classification Search
CPC ..... B60K 28/02; B60W 30/182; B60W 50/14; B60W 60/0013; B60W 60/0015; B60W 2540/229; B60W 2720/10; B60W 2720/12; B60W 2040/0818; B60W 2050/0057; B60W 2050/0071; B60W 40/08; B60W 60/0018; B60W 60/0051; B60W 2050/143; B60W 2420/54; B60W 2540/01; B60W 2540/223; B60W 40/09; B60W 60/0059; B60W 60/00259; B60W 40/105; B60W 2050/0005; B60W 2520/10; B60W 2540/30; G10L 25/51; G10L 25/18; G10L 25/48; H04R 1/02; H04R 1/08; H04R 2499/13; H04R 3/005; G01S 7/539;
(Continued)

(56) References Cited

U.S. PATENT DOCUMENTS

2008/0065291 A1* 3/2008 Breed .................... G08B 21/22
382/190
2018/0096475 A1* 4/2018 Jemander .............. G01S 13/582
(Continued)

FOREIGN PATENT DOCUMENTS

JP 2013536493 A 9/2013
WO 2019122414 A1 6/2019

*Primary Examiner* — Anh V La
(74) *Attorney, Agent, or Firm* — WOMBLE BOND DICKINSON (US) LLP

(57) ABSTRACT

Sound signals that are not audible are generated by one or more speakers disposed in the vehicle. Reflected sound signals from a driver or a passenger of the vehicle that are not audible are received by one or more microphones disposed in the vehicle. A behavior-induced acoustic pattern is detected based on the reflected ultrasound signals. The behavior-induced acoustic pattern is analyzed to recognize a behavior of the driver or the passenger of the vehicle. A response or an alert is generated according to the recognized behavior of the driver or the passenger in the vehicle.

20 Claims, 13 Drawing Sheets

(51) Int. Cl.
*B60W 60/00* (2020.01)
*B60W 30/182* (2020.01)
*B60W 50/14* (2020.01)
*G10L 25/51* (2013.01)
*H04R 1/02* (2006.01)
*H04R 1/08* (2006.01)

(52) U.S. Cl.
CPC .... *B60W 60/0013* (2020.02); *B60W 60/0015* (2020.02); *G10L 25/51* (2013.01); *H04R 1/02* (2013.01); *H04R 1/08* (2013.01); *B60W 2540/229* (2020.02); *B60W 2720/10* (2013.01); *B60W 2720/12* (2013.01); *H04R 2499/13* (2013.01)

(58) Field of Classification Search
CPC ........ G01S 15/52; G01S 15/32; G01S 15/586; B60R 11/0217
USPC .............. 340/576, 573.1, 425.5, 426.22, 439
See application file for complete search history.

(56) References Cited

U.S. PATENT DOCUMENTS

| | | | | |
|---|---|---|---|---|
| 2018/0306917 | A1* | 10/2018 | Fekete | G01S 13/56 |
| 2019/0190693 | A1* | 6/2019 | Wetzker | H04W 74/0858 |
| 2019/0258253 | A1* | 8/2019 | Tremblay | G05D 1/0088 |
| 2019/0318181 | A1* | 10/2019 | Katz | G06F 3/012 |
| 2020/0383580 | A1* | 12/2020 | Shouldice | B60W 50/14 |
| 2021/0402942 | A1* | 12/2021 | Torabi | G06N 3/0454 |

* cited by examiner

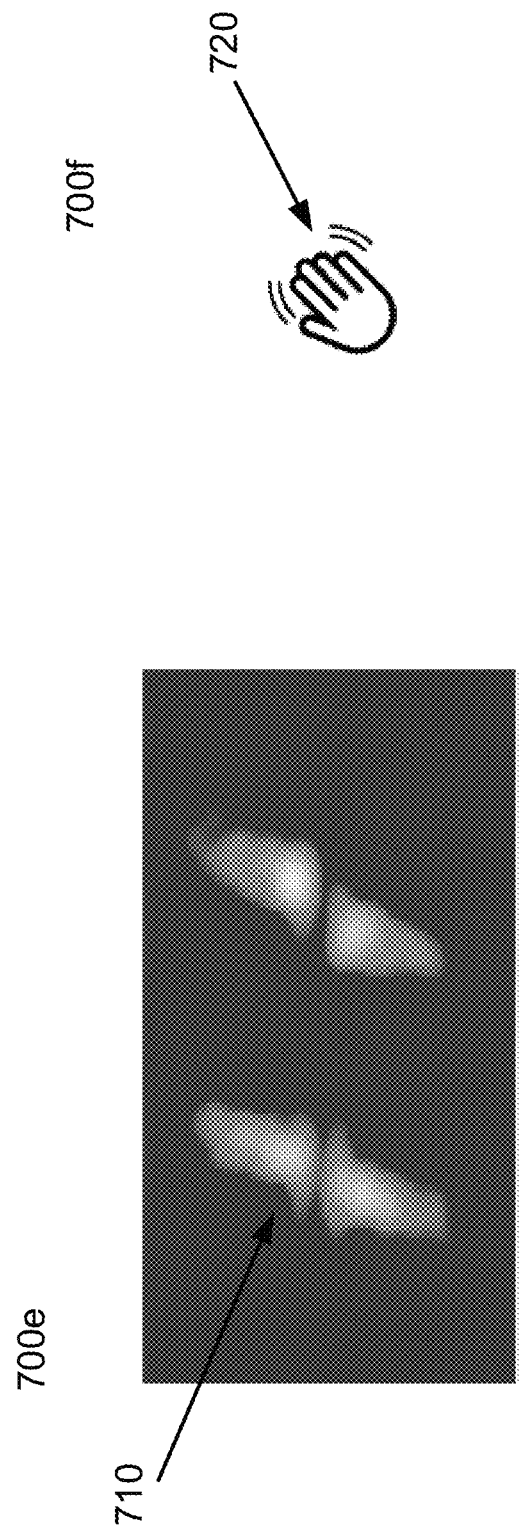

IN-VEHICLE ACOUSTIC MONITORING SYSTEM FOR DRIVER AND PASSENGER

TECHNICAL FIELD

Embodiments of the present disclosure relate generally to operating autonomous driving vehicles (ADVs). More particularly, embodiments of the disclosure relate sensing systems for the ADVs.

BACKGROUND

Real-time behavior sensing and monitoring of a driver and/or a passenger is important in operating autonomous driving vehicles no matter whether an active driver is present or not. Improper behaviors such as phone using, eating, drowsy driving and aggressive actions may significantly harm the driving safety, especially when an autonomous driving mode is off (or partially off). Other behaviors, such as gestures, may be utilized for control and interaction with the vehicle. However, in-vehicle cameras and visual solutions may bring privacy concern. There has been a lack of efficient way for monitoring drivers or passengers of a vehicle, particularly in an autonomous driving vehicle (ADV).

BRIEF DESCRIPTION OF THE DRAWINGS

Embodiments of the disclosure are illustrated by way of example and not limitation in the figures of the accompanying drawings in which like references indicate similar elements.

FIG. 7E illustrate an example of a behavior-induced acoustic pattern detected in an enhanced power spectrogram.

FIG. 7F illustrates an example of a recognized behavior corresponding to the detected behavior-induced acoustic pattern in FIG. 7E.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, acoustic sensing and Doppler effect are utilized to detect the behaviors of the driver and the passenger(s) of an autonomous driving vehicle (ADV). For example, the in-vehicle audio system is utilized to perform driver/passenger behavior detection. The sound generator or sound capturing devices such as speakers and microphones inside the vehicle are employed as emitters and receivers of sound signals, e.g., ultrasound signals. The behavior-induced acoustic patterns are extracted and analyzed, e.g., using machine learning and deep learning methods, or matching the behavior-induced acoustic patterns with a list of predetermined acoustic patterns representing a list of pre-categorized behaviors. Based on the behavior and the identity of the performer, the ADV may estimate the risk level of the behavior. The ADV may choose to change the driving strategy correspondingly and/or respond with action, thereby enhancing the driving safety and enable a smart and smooth passenger-vehicle interaction.

According to some embodiments, sound signals that are not audible are generated by one or more sound generating devices such as speakers disposed in the vehicle. Reflected sound signals that are reflected or returned from a driver or a passenger of the vehicle are captured by one or more sound capturing devices such as microphones disposed in the vehicle. A behavior-induced acoustic pattern is detected based on the reflected ultrasound signals. The behavior-induced acoustic pattern is analyzed to recognize a behavior of the driver or the passenger of the vehicle, for example, using an artificial intelligence (AI) model or by comparing and matching the behavior-induced acoustic pattern against a list of predetermined acoustic patterns corresponding to a list of predetermined behaviors. A response or an alert is generated according to the recognized behavior of the driver or the passenger of the vehicle.

Figure 1:
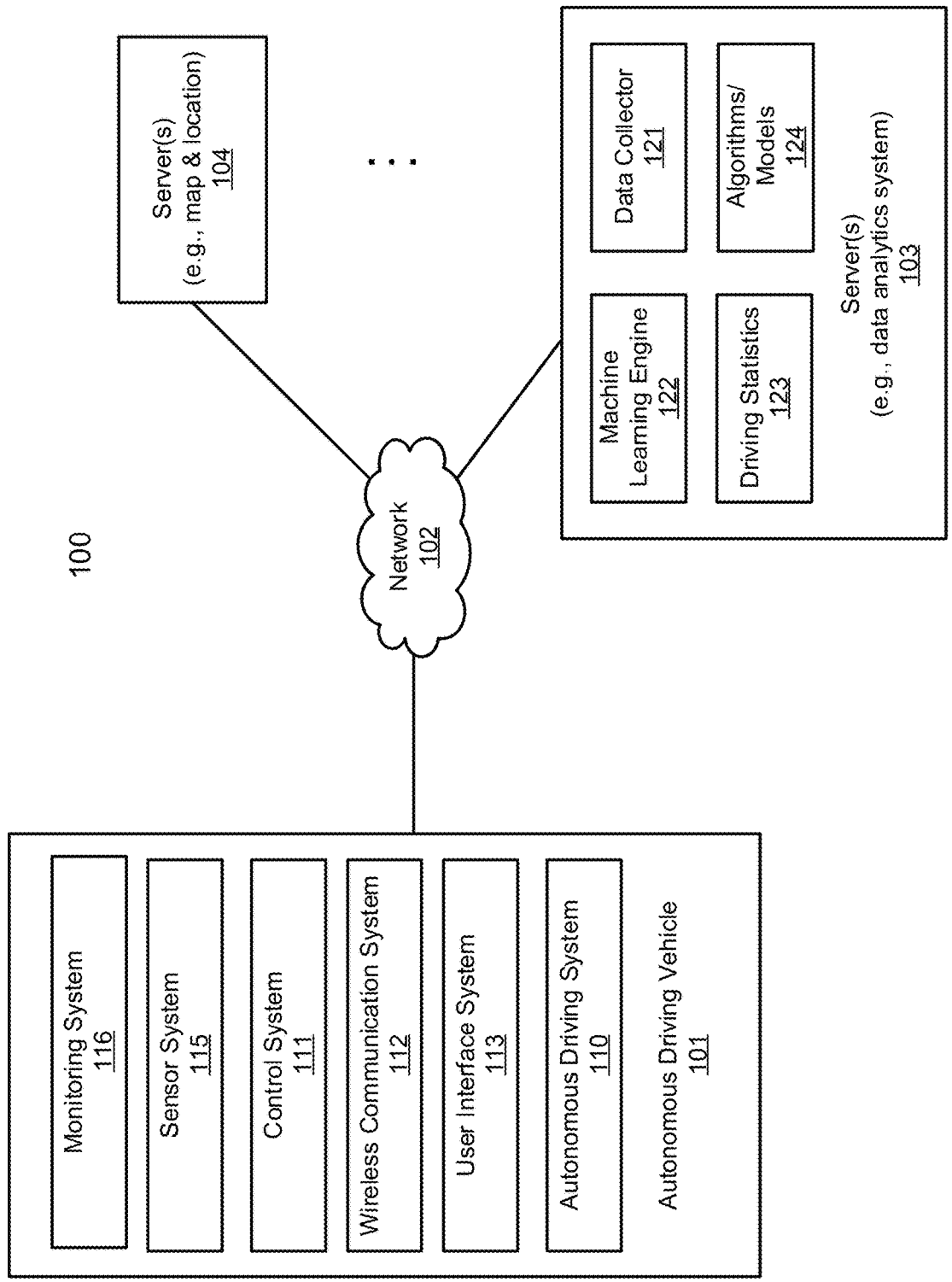
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc. In one embodiment, ADV 101 may include monitoring system 116 to monitor a behavior of a driver or a passenger based on sound signals, which will be describe in detail below.

Components 110-116 may be communicatively coupled to each other via an interconnect, a bus, a network, or a combination thereof. For example, components 110-116 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
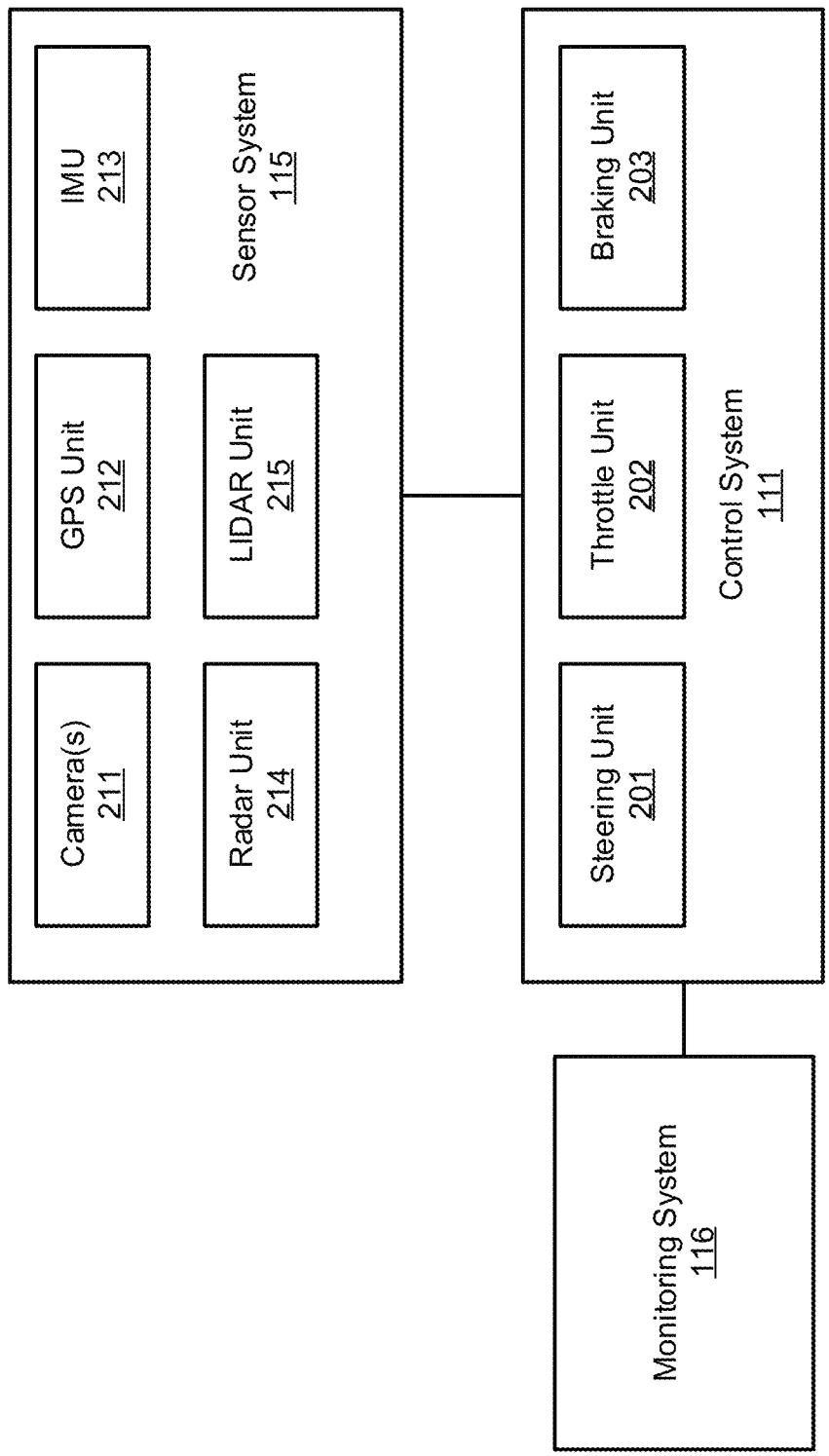
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to generate sound signals that are not audible by one or more speakers, an algorithm or model to receive reflected sound signals that are not audible by one or more microphones, an algorithm or model to detect a behavior-induced acoustic pattern based on the reflected ultrasound signals; an algorithm or model to analyze the behavior-induced acoustic pattern to recognize a behavior of a driver or a passenger, an algorithm or model to determine a risk level of the driver or the passenger, and/or an algorithm or model to generate a response according to the determined risk level of the driver or the passenger. Algorithms 124 can then be uploaded on ADVs to be utilized during autonomous driving in real-time.

Figure 3A:
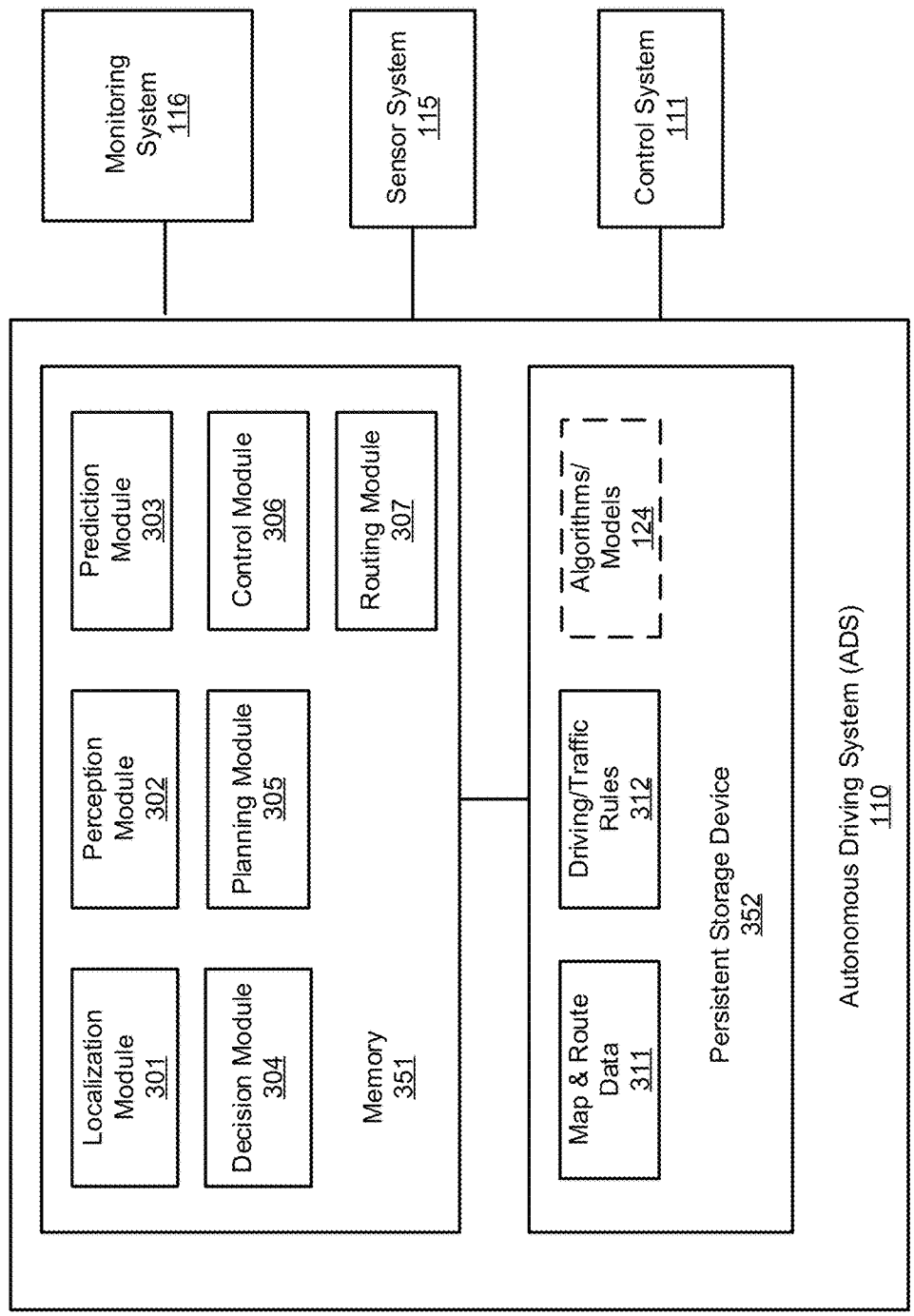
FIGS. 3A-3B are block diagrams illustrating an example of an autonomous driving system used with an autonomous driving vehicle according to one embodiment.
Figure 3B:
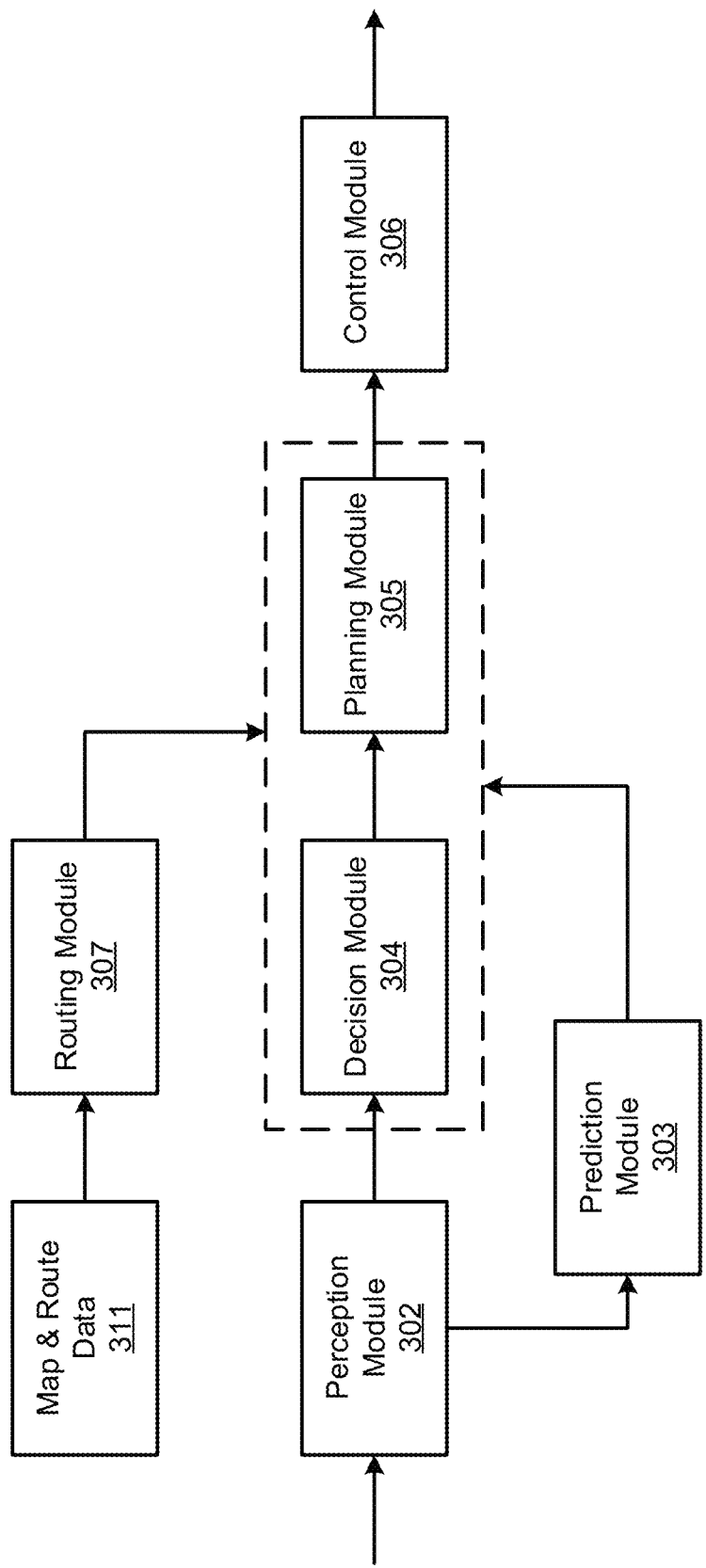

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307.

301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
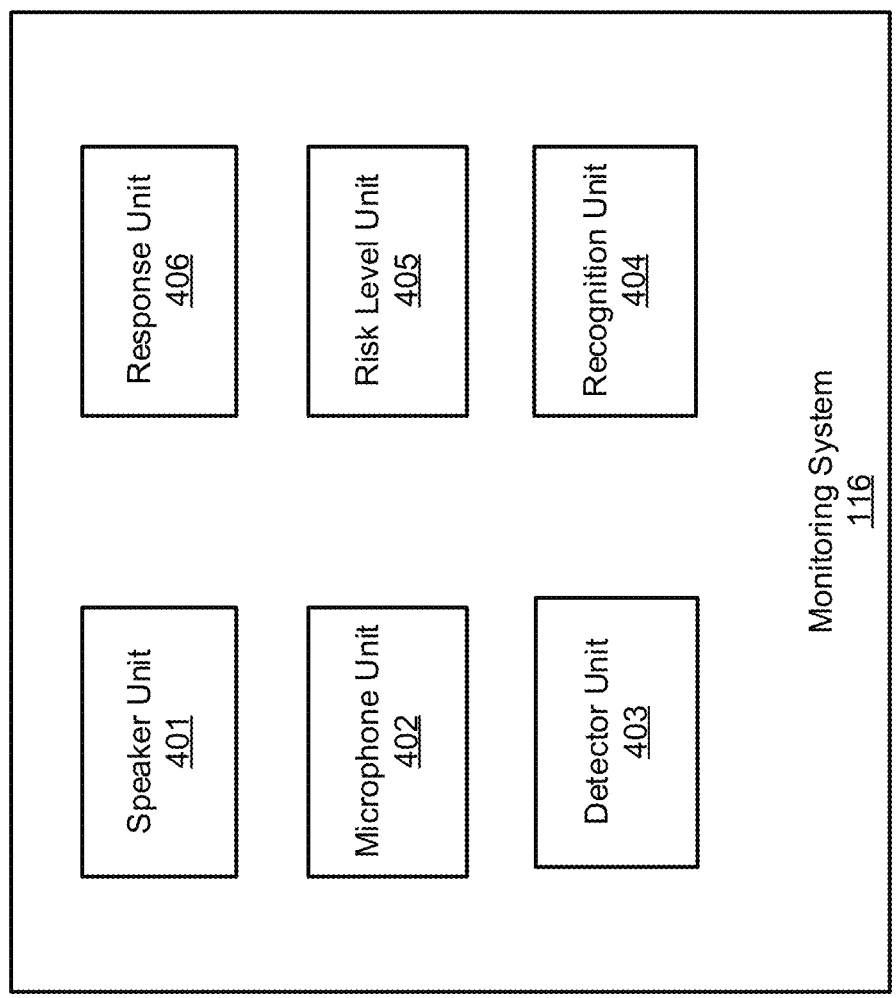
FIG. 4 is a block diagram illustrating an example of a monitoring system according to one embodiment.

FIG. 4 is a block diagram illustrating an example of a monitoring system 116 according to one embodiment. Monitoring system 116 may be implemented to monitor a behavior of a driver or a passenger and generate a response. Referring to FIG. 4, monitoring system 116 includes, but not being limited to, speaker unit 401, microphone unit 402, detector unit 403, recognition unit 404, risk level unit 405 and response unit 406. The monitoring system 116 is configured to recognize and monitor the behaviors in a moving vehicle, to enhance the driving safety and enable a smart and smooth passenger-vehicle interaction. The monitoring system 116 bridges the gap between the recognition task and the adjustment of the vehicle's operation mode, forming a closed loop system.

In one embodiment, the speaker unit 401 includes one or more sound generators such as speakers and is configured to generate sound signals that are not audible using one or more sound generators disposed at various locations within the vehicle. The sound signals may be reflected or returned from a driver or a passenger of the vehicle. The microphone unit 402 includes one or more sound capturing devices such as microphones and is configured to capture reflected sound signals that are reflected or returned from the driver or the passenger of the vehicle and are not audible using one or more microphones disposed at different locations within the vehicle. The detector unit 403 is configured to detect a behavior-induced acoustic pattern based on the reflected ultrasound signals. The recognition unit 404 is configured to analyze the behavior-induced acoustic pattern to determine or recognize a behavior of a driver or a passenger of the vehicle.

The sound signals travel from the one or more speakers, through air, received by the one or more microphones. On its way, the sound wave may be deflected or disrupted by user motion, but still reach the microphones, e.g., based on Doppler effect. For example, the sound signals may hit the driver or the passenger of the vehicle and reflect back from the driver or the passenger. The sound signals reflected back from the driver or passenger may cause a sudden change in the sound signals due to Doppler effect.

In one embodiment, the behavior of the driver or passenger may be determined by applying an AI model or machine-learning model to a set of features extracted from the reflected sound signals. In one embodiment, the behavior may be determined by comparing or matching the acoustic pattern against a list of predetermined acoustic patterns representing a list of predetermined behaviors. By analyzing the acoustic pattern, the behavior of the person may be determined. For example, when the driver or passenger in the ADV may have a movement, the reflected signals which are inaudible sound signals reflected back from the driver or passenger may cause a sudden change in the sound signals based on Doppler effect. The Doppler effect (or the Doppler shift) is the change in frequency of a wave in relation to an observer who is moving relative to the wave source. The sudden change in the sound signals may indicate a detected behavior event from the driver or passenger. In one embodiment, after applying a band-pass filter onto the reflected sound signals, a band-stop filter may be applied to remove the audio component with an exact frequency of a probe signal, which may be the inaudible sound signal generated by the one or more speakers. Thus, only the reflected sound signals resulted from or caused by human motions based on Doppler effect may be retained.

The risk level unit 405 is configured to determine a risk level of the driver or the passenger based on the behavior of the driver or the passenger in view of a set of risk level thresholds. For example, certain behaviors of a passenger may not be risky, while the same behavior of a driver may be considered risky. The response unit 406 is configured to generate a response or an alert according to the determined risk level of the driver or the passenger.

Figure 5A:
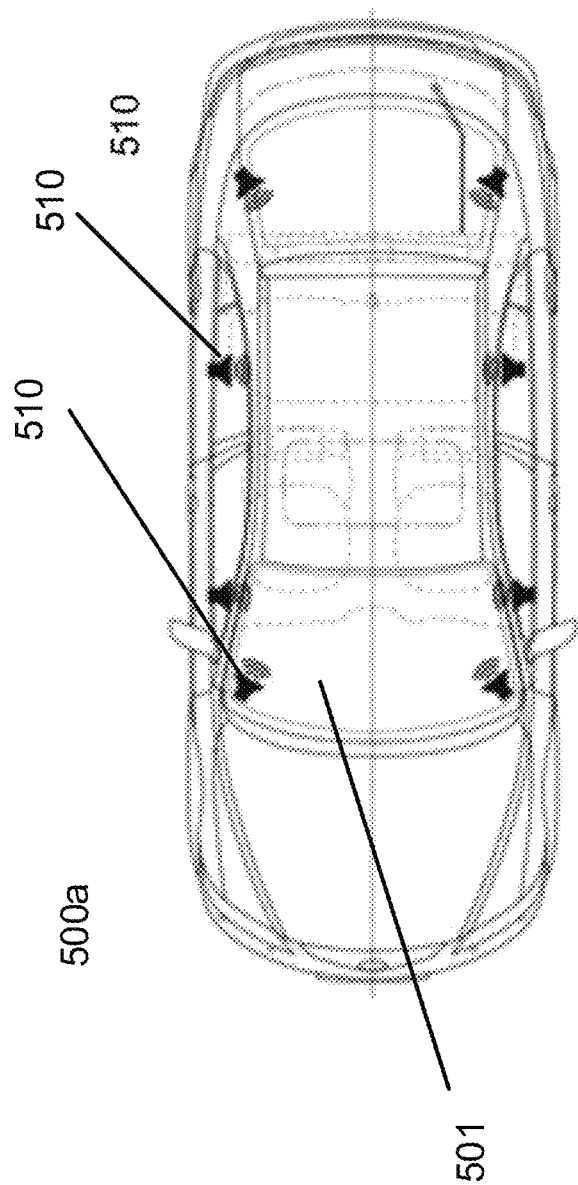
FIG. 5A is a block diagram illustrating a top view of an ADV with one or more speakers according to one embodiment.
Figure 5B:
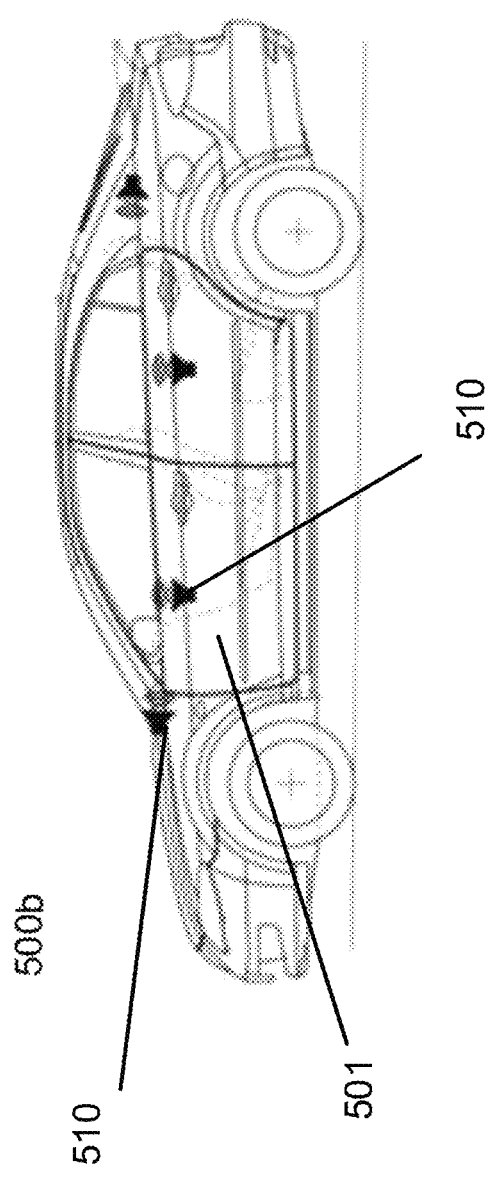
FIG. 5B is a block diagram illustrating a side view of the ADV with the one or more speakers according to one embodiment.

FIG. 5A is a block diagram 500*a* illustrating a top view of one or more speakers 510 disposed in an ADV 501. FIG. 5B is a block diagram 500*b* illustrating a side view of the one or more speakers 510 disposed in the ADV 501. Referring to FIG. 5A and FIG. 5B, monitoring system 116 includes the speaker unit 401, which includes the one or more speakers 510. The one or more speakers 510 are configured to generate sound signals that are not audible for humans. The sound signal may be generated with a fixed frequency or with modulated changing frequencies. For example, the one or more speakers 510 are configured to generate ultrasound signals. The frequency range a normal human can hear is from about 20 Hz to 20 kHz. So generally, the sound signals that fall out of this range (>20 kHz or <20 Hz) are not audible to human. Generally, the sound with frequency >20 kHz is regarded as ultrasound. The low-frequency sound which the human ear cannot detect is known as infrasonic sound. In one embodiment, the sound signals that are not audible may include ultrasound signals. In one embodiment, the sound signals that are not audible may include infrasonic sound signals.

The one or more speakers 510 may be disposed at four corners of the ADV. The one or more speakers 510 may be disposed at front left side, rear left side, front right side, rear right side of the ADV. In one embodiment, the one or more speakers 510 may utilize the in-vehicle audio system of the ADV. In one embodiment, the one or more speakers 510 may be configured to generate ultrasound signals. The one or more speakers 510 may be any type or any kind of speakers, as long as being able to generate sound signals that are not audible for human.

Figure 5C:
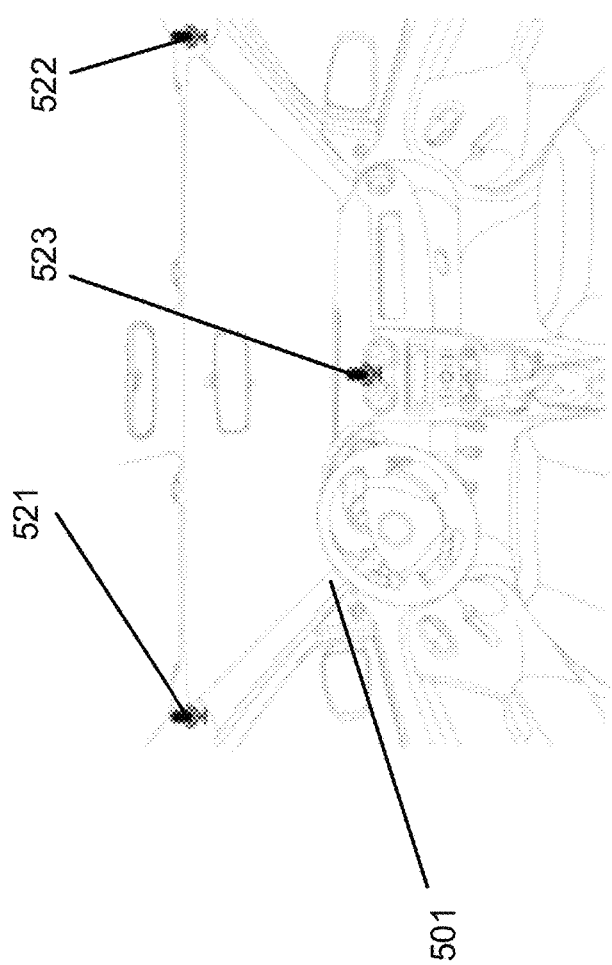
FIG. 5C and FIG. 5D are block diagrams illustrating one or more microphones disposed in an ADV according to one embodiment.
Figure 5D:
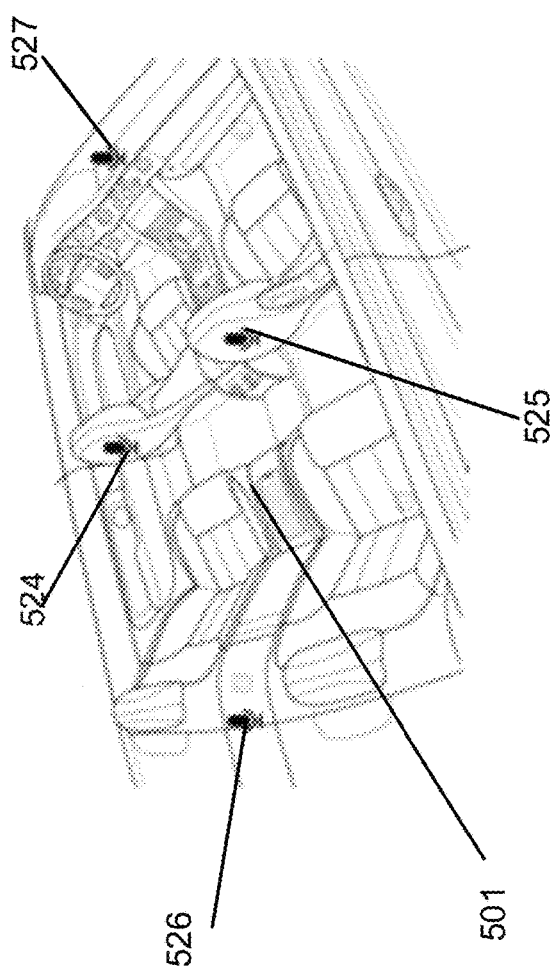

FIG. 5C and FIG. 5D are block diagrams 500*c*, 500*d* illustrating one or more microphones (e.g., 521-527) disposed in the ADV 501. The one or more microphones may be disposed at an upper front left corner (e.g., 521), an upper front right corner (e.g., 522), or between a driver seat and a front passenger seat (e.g., 523). The one or more microphones may be disposed at a back of the driver seat (e.g., 524) or a back of the front passenger seat (e.g., 525), or between two back passenger seats (e.g., 526), or at a center location in the front (e.g., 527). The one or more microphones may be disposed in other locations inside the ADV 501, where reflected sound signals from a driver or a passenger are not blocked by obstacles (e.g., seats, doors, armrest box, back corners in the vehicle, etc.) in the ADV. The one or more microphones (e.g., 521-527) are configured to receive the reflected sound signals from the driver or the passenger. The sound signals that are not audible, e.g., ultrasound signals, generated by the one or more speakers (e.g., 510) may incident on the driver or the passenger, and the sound signals may reflect from the driver or the passenger. The reflected sound signals from the driver or the passenger may be received by the one or more microphones (e.g., 521-527).

Figure 6:
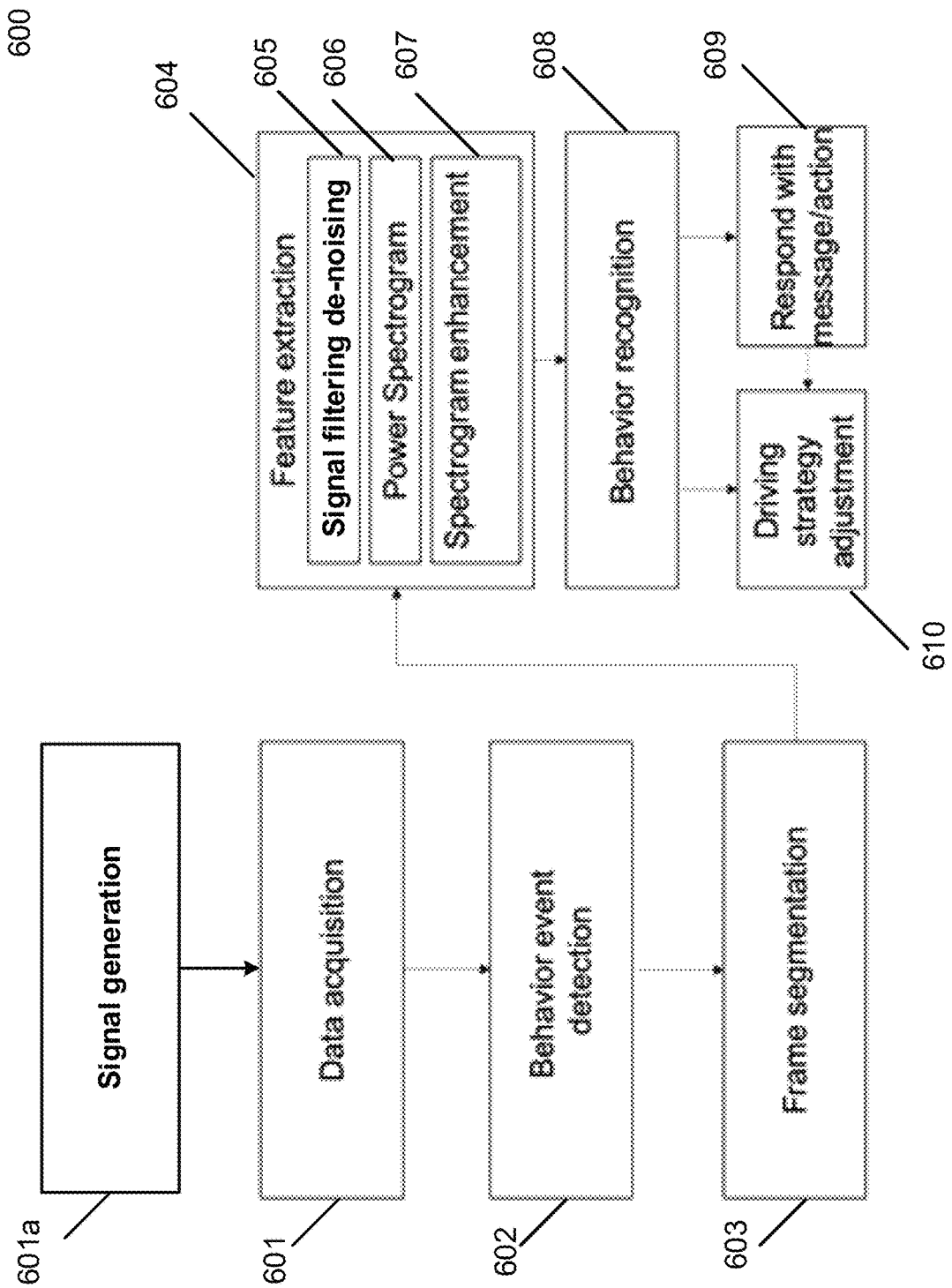
FIG. 6 is a flow diagram illustrating an example of acoustic monitoring a driver or passenger behavior in an autonomous driving vehicle according to one embodiment.

FIG. 6 is a flow diagram illustrating an example of acoustic monitoring a driver or passenger behavior in an autonomous driving vehicle according to one embodiment. A monitoring system 116 is configured to monitor a behavior of a driver or passenger in an ADV based on acoustic monitoring. In this way, there is not much privacy concern. The risky behavior from the driver may be intervened, thus, the driving safety may be enhanced. Further, the comfort of the passenger may be increased to enable a smooth passenger-vehicle interaction.

At block 601*a*, one or more speakers or other sound generators in an ADV may generate inaudible sound signals, for example, ultrasound signals.

Figure 7B:
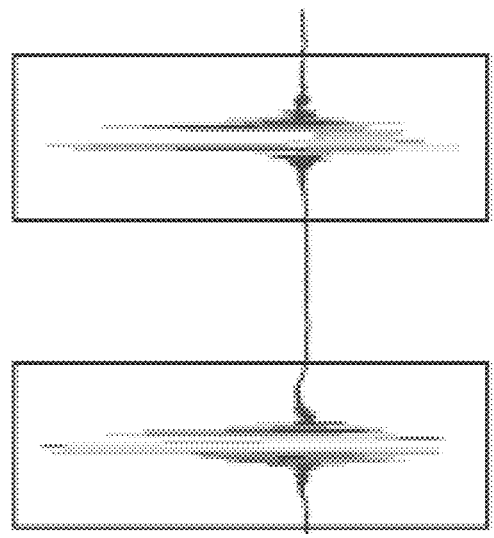
FIG. 7B illustrate an example of a detected event from acoustic monitoring according to one embodiment.
Figure 7A:
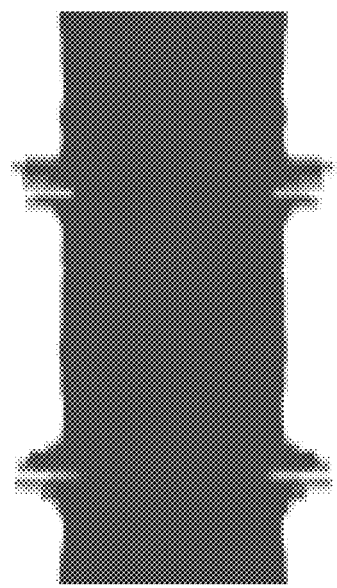
FIG. 7A illustrate an example of data received from acoustic monitoring according to one embodiment.

As illustrated at block 601, one or more microphones or other sound receivers may receive the inaudible sound signals, for example, the ultrasound signals. Data acquired from the one or more microphones or the other sound receivers may be input to a detector unit 403 in the monitoring system 118 (as described in connection with FIG. 4). An example of the data received from the one or more microphones or the other sound receivers is illustrated in diagram 700*a* in FIG. 7A.

In block 602, a behavior event from the driver or passenger may be detected. The behavior event is an event from a behavior or movement resulted from the driver or passenger in the ADV. For example, when the driver or passenger in the ADV may have a movement, reflected signals which are inaudible sound signals reflected back from the driver or passenger may cause a sudden change in the sound signals based on Doppler effect. The Doppler effect (or the Doppler shift) is the change in frequency of a wave in relation to an observer who is moving relative to the wave source. The sudden change in the sound signals may indicate a detected behavior event from the driver or passenger. An example of a detected behavior event in the sound signals is illustrated in diagram 700*b* in FIG. 7B.

At block 603, frames in the sound signals are segmented for feature extraction and behavior recognition.

At block 604, a behavior feature including a behavior-induced acoustic pattern is extracted from the sound signals. At block 605, the sound signals may be filtered and denoised. The sound signals may be filtered to reduce the noises out of the frequency range of interest. For example, the filer may be a band-pass filter or a band-stop filter. For example, the inaudible sound signals are ultrasound signals, the filter may be configured to filter out sound signals outside a predetermined range. For example, the predetermined range may be 19 kHz-21 kHz. The sound signals outside the predetermined range may be noises or outliers.

At block 606, a power spectrogram of the filtered sound signals may be obtained. A spectrogram is a visual representation of the spectrum of frequencies of a signal as it varies with time. A power spectrogram represents a power level of a signal in each frequency band over time. In one embodiment, after applying the band-pass filter onto the sound signals, a band-stop filter may be applied to remove the audio component with an exact frequency of a probe signal, which may be the inaudible sound signal generated by the one or more speakers. Thus, only the sound signals resulted from or caused by human motions based on Doppler effect may be retained. For example, the band-stop filer may cut off sound signals in an unwanted frequency range above a first predetermined threshold and below a second predetermined threshold. The sound signals above the first predetermined threshold and below the second predetermined threshold may be dominated by the probe signal. In one embodiment, the probe signal may have a frequency of 20 kHz. As an example, the first predetermined threshold may be 20.2 kHz, and the second predetermined threshold may be 19.8 kHz.

Figure 7D:
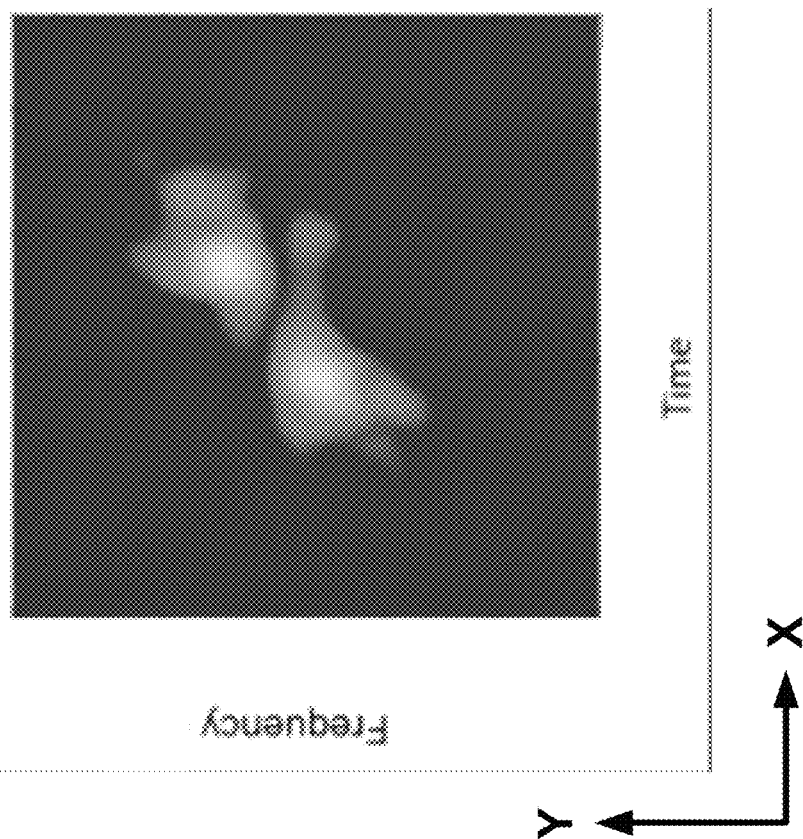
FIG. 7D illustrate an example of an enhanced power spectrogram from acoustic monitoring according to one embodiment.
Figure 7C:
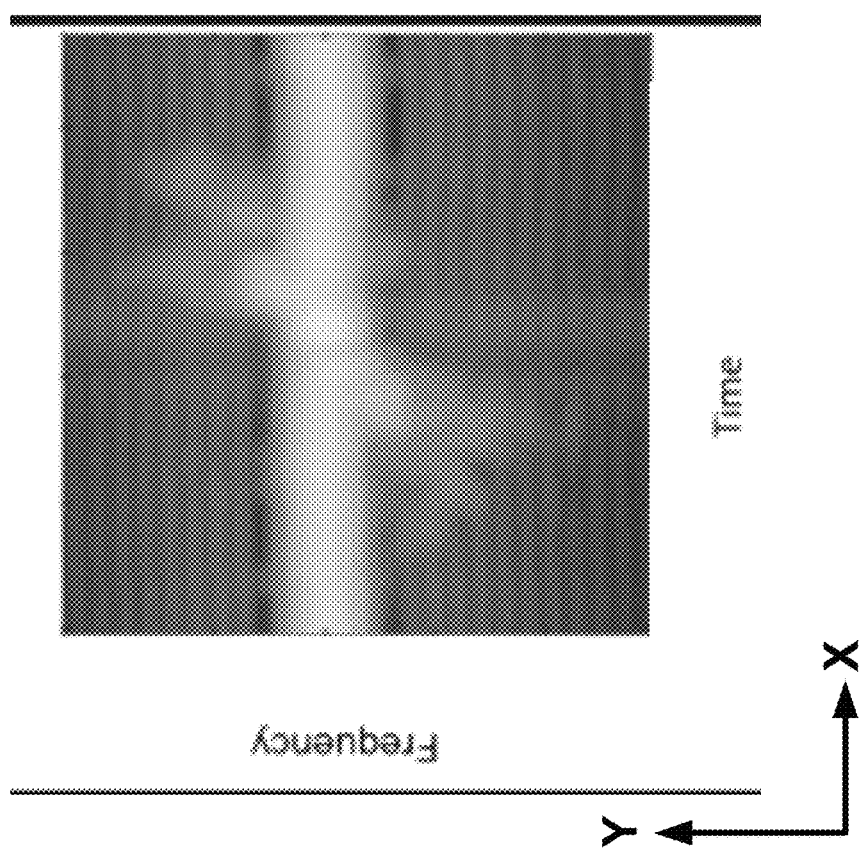
FIG. 7C illustrate an example of a power spectrogram from acoustic monitoring according to one embodiment.

Next, a short-time Fourier transform (STFT) may be applied to obtain the power spectrogram of the sound signals. FIG. 7C illustrate an example of the power spectrogram 700c of the sound signals. As illustrated in FIG. 7C, the x-axis represents time, the y-axis represents frequency, and the value of each coordinate point represents a magnitude of a power of a sound signal. In the power spectrogram, different colors or different shades of color represent different power levels, which may represent different behaviors. In FIG. 7C, a brighter color (yellow) represents a higher power level, and a darker color (dark blue) represents a lower power level.

At block 607, a further processed and enhanced power spectrogram may be obtained based on the power spectrogram. FIG. 7D illustrate an example of the enhanced power spectrogram 700d. Based on the power spectrogram 700c, a power value threshold may be determined. The power value threshold may be determined according to the sound signal and the motions involved. The enhanced power spectrogram 700d may be obtained by setting a magnitude of a power value of a respective point to zero, if the power value of the respective point is less than a power value threshold, for each point in the power spectrogram 700c. Further image denoising or smoothing filters may be applied to get better effect to obtain the enhanced power spectrogram 700d.

At block 608, a behavior of the driver or passenger(s) may be recognized based on a behavior-induced acoustic pattern, which may be detected based on the enhanced power spectrogram, for example, by comparing or matching the power spectrogram against a list of predetermined power spectrograms corresponding to a list of predetermined behaviors. FIG. 7E illustrates an example of a behavior-induced acoustic pattern 710 detected in an enhanced power spectrogram 700e. FIG. 7F illustrates an example of a recognized behavior 720 corresponding to the detected behavior-induced acoustic pattern 710. Different behaviors or motions from the driver or the passenger(s) correspond to different behavior-induced acoustic patterns due to the Doppler effect. As an example, a clapping behavior as illustrated in FIG. 7F corresponds to the behavior-induced acoustic pattern 710 as illustrated in FIG. 7E. When the driver or the passenger(s) has a motion or a behavior, such as making a gesture, using phone, eating, drowsily leaning forward, etc., a behavior-induced acoustic pattern may be detected. The behavior-induced acoustic pattern (e.g., 710) may be analyzed using machine learning and deep learning methods to recognize the corresponding behavior (e.g., 720).

In one embodiment, whether the behavior is from the driver or from the passenger of the vehicle is further determined. When the behavior is from the driver, there may be a potential risk to the safety concerns. Thus, it is important to determine whether the behavior is from the driver or from the passenger of the vehicle. The behavior is from the driver or from the passenger of the vehicle, may be determined based on the source of the sound signals, e.g., inaudible sound signals, detected.

Figure 8:
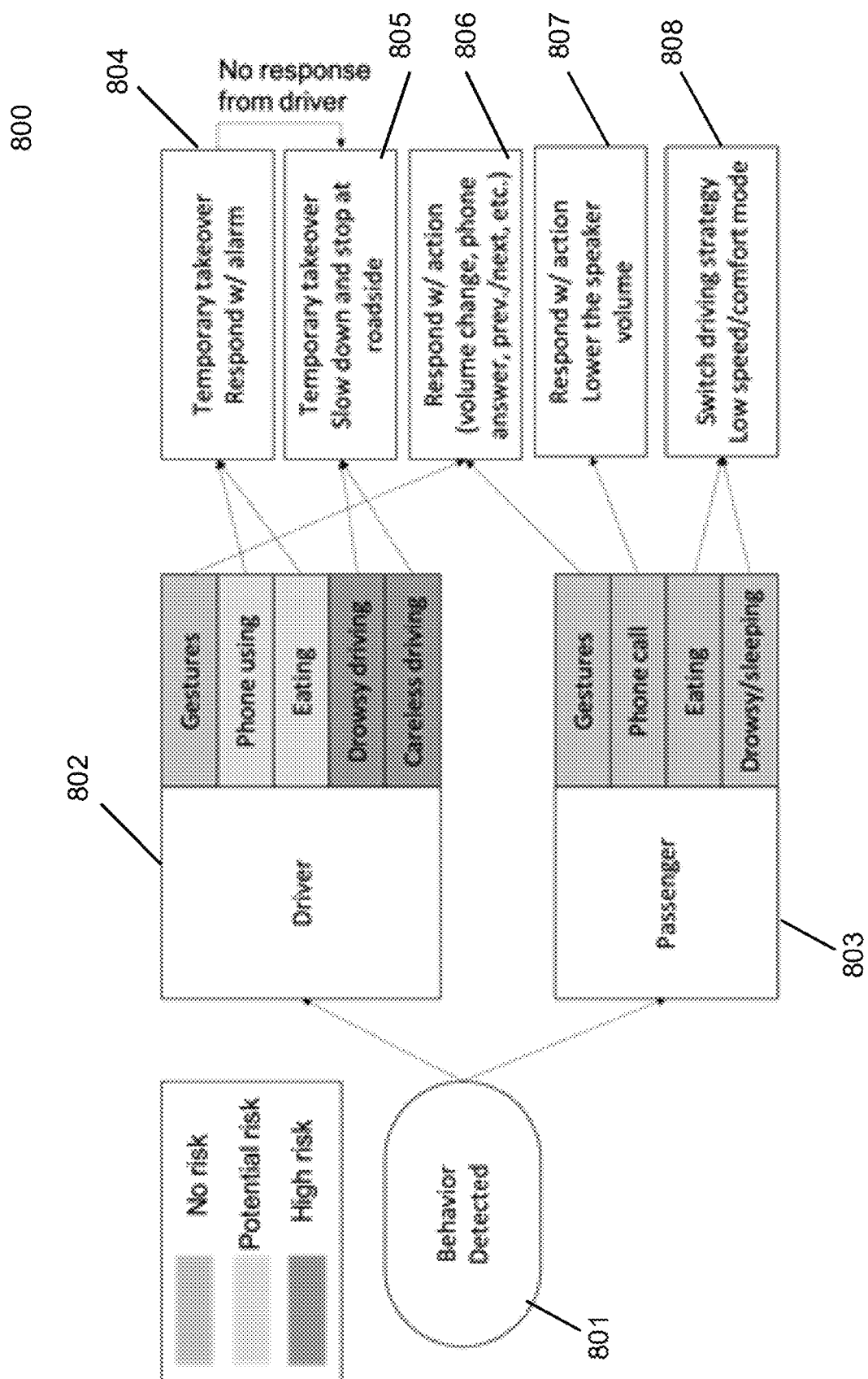
FIG. 8 is a block diagram illustrating an example of detected behaviors and responses of the ADV from acoustic monitoring according to one embodiment.

FIG. 8 is a block diagram illustrating an example of detected behaviors and responses of the ADV. The detected behaviors 801 may include behavior(s) 802 from the driver or behavior(s) 803 from the passenger. For example, the behavior(s) 802 from the driver may include gesture, phone using, eating, drowsy driving, or careless driving, etc. The behavior(s) 803 from the passenger may include gesture, phone using, eating, drowsy/sleeping, etc. There may be other behaviors from the driver or the passenger(s) may be detected. A risk level of the recognized behavior of the driver or the passenger may be determined as illustrated in FIG. 8.

As an example, the risk level of the recognized behavior may be classified as no risk, potential risk, or high risk. For example, a gesture from the driver may be determined as no risk; driver phone using and eating may be determined as potential risk; drowsy driving or careless driving may be determined as high risk. The behavior of the passenger(s) may be determined as no risk. There may be other ways to classify the different types of behaviors as well.

The responses of the ADV may be generated according to the determined risk level of the driver or the passenger. In one embodiment, when the determined risk level being potential risk, the ADV may generate an alarm and activate an automatic driving mode to temporarily take over the driving, as illustrated at block 804.

In one embodiment, when the determined risk level being high risk, the ADV may generate an alarm and activate an automatic driving mode to temporarily take over to slow down to stop at a road side, as illustrated at block 805. When the determined risk level being potential risk, however, there is no response from the driver after the alarm is generated, the ADV may take over to slow down to stop at a road side.

When the determined risk level being no risk, and when the behavior is from the driver, e.g., the driver is making a gesture, the ADV may respond by turning on the radio/music, changing a volume of an audible sound of one or more speakers, continuing monitoring, etc., as illustrated in block 806.

When the detected behavior is from the passenger(s) and the vehicle is in an autonomous driving mode, the ADV may lower a speed of the ADV or switching to a comfort module of the autonomous driving mode, as illustrated at block 808; or the ADV may lower a volume of an audible sound of one or more speakers, as illustrated at block 807.

Figure 9:
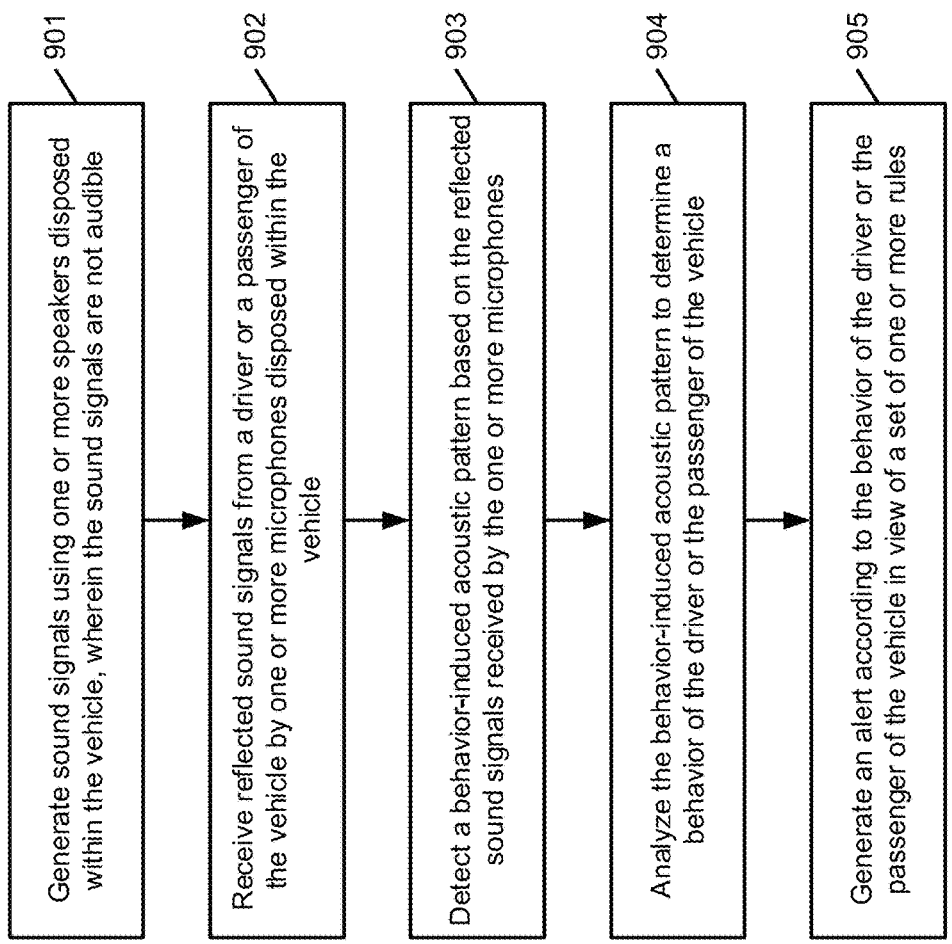
FIG. 9 is a flow diagram illustrating a process of acoustic monitoring a behavior of a driver or passenger in an ADV.

FIG. 9 is a flow diagram illustrating a process of acoustic monitoring a behavior of a driver or passenger in an ADV. By this process, the behavior of the driver or passenger in the ADV may be monitoring, without much privacy concern. The risk level of the driver or the passenger may be determined, and a response may be generated to enhance the driving safety and comfort. Process 900 may be performed by processing logic which may include software, hardware, or a combination thereof. For example, process 900 may be performed by monitoring module 116.

Referring to FIG. 9, in operation 901, processing logic generates sound signals that are not audible, by one or more speakers disposed in the vehicle. In one embodiment, the sound signals that are not audible are generated continuously by the one or more speakers disposed in the vehicle, and the sound signals that are not audible are ultrasound signals.

In operation 902, processing logic receives reflected sound signals that are not audible, by one or more microphones disposed in the vehicle. In one embodiment, the one or more microphones are disposed at an upper front left corner, an upper front right corner, between a driver seat and a front passenger seat, a back of the driver seat or the front passenger seat, or between two back passenger seats in the vehicle.

In operation 903, processing logic detects a behavior-induced acoustic pattern based on the reflected sound signals. In one embodiment, processing logic may detect a behavior event based on the reflected sound signals. In one embodiment, processing logic may filter the reflected sound signals.

In one embodiment, processing logic may further extract a power spectrogram based on the reflected sound signals. In one embodiment, processing logic may obtain an enhanced power spectrogram based on the power spectrogram. In one embodiment, processing logic may obtain the behavior-induced acoustic pattern based on the enhanced power spectrogram.

In operation 904, processing logic analyzes the behavior-induced acoustic pattern to recognize a behavior of a driver or a passenger in the vehicle. In one embodiment, processing logic may determine whether the behavior is from the driver or from the passenger of the vehicle.

In operation 905, processing logic generates a response according to the recognized behavior of the driver or the passenger in the vehicle.

In one embodiment, processing logic may determine a risk level of the recognized behavior of the driver or the passenger, and the response may be further generated based on the determined risk level of the recognized behavior of the driver or the passenger.

In one embodiment, when the behavior is from the driver, processing logic may generate an alarm and activate an automatic driving mode to slow down to stop at a road side in response to the determined risk level being high risk, or generate an alarm and activate an automatic driving mode in response to the determined risk level being potential risk.

In one embodiment, when the behavior is from the passenger and the vehicle is in an autonomous driving mode, processing logic may lower a speed of the vehicle or switch to a comfort module of the autonomous driving mode.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating a vehicle, the method comprising:
   generating sound signals using one or more speakers disposed within the vehicle, wherein the sound signals are not audible;
   receiving reflected sound signals from a driver or a passenger of the vehicle by one or more microphones disposed within the vehicle;
   detecting a behavior-induced acoustic pattern based on the reflected sound signals received by the one or more microphones;
   analyzing the behavior-induced acoustic pattern to determine a behavior of the driver or the passenger of the vehicle; and
   generating an alert according to the behavior of the driver or the passenger of the vehicle in view of a set of one or more rules.

2. The method of claim 1, wherein the sound signals comprise ultrasound signals.

3. The method of claim 1, wherein the one or more microphones are disposed at an upper front left corner, an upper front right corner, between a driver seat and a front passenger seat, a back of the driver seat or the front passenger seat, or between two back passenger seats in the vehicle.

4. The method of claim 1, wherein analyzing the behavior-induced acoustic pattern to determine a behavior of the driver or the passenger of the vehicle comprises matching the behavior-induced acoustic pattern with a list of predetermined acoustic patterns representing a list of predetermined behaviors.

5. The method of claim 1, wherein detecting a behavior-induced acoustic pattern based on the reflected sound signals includes extracting a power spectrogram based on the reflected sound signals.

6. The method of claim 5, wherein analyzing the behavior-induced acoustic pattern to determine a behavior of the driver or the passenger of the vehicle comprises comparing the power spectrogram with a predetermined power spectrogram associated with a particular behavior.

7. The method of claim 1, further comprising determining a risk level of the behavior of the driver or the passenger, and wherein the alert is further generated based on the risk level of the behavior of the driver or the passenger.

8. The method of claim 7, wherein generating the alert according to the risk level of the driver or the passenger includes, when the behavior is from the driver,
   generating an alarm and activating an automatic driving mode to slow down to stop at a road side in response to the determined risk level being higher than a predetermined risk threshold.

9. The method of claim 7, wherein generating the alert according to the risk level of the driver or the passenger includes, when the behavior is from the passenger and the vehicle is in an autonomous driving mode, reducing a speed of the vehicle or switching to a comfort driving mode of the autonomous driving mode.

10. A non-transitory machine-readable medium having instructions stored therein, which when executed by a processor, cause the processor to perform operations of operating a vehicle, the operations comprising:
   generating sound signals using one or more speakers disposed within the vehicle, wherein the sound signals are not audible;
   receiving reflected sound signals from a driver or a passenger of the vehicle by one or more microphones disposed within the vehicle;
   detecting a behavior-induced acoustic pattern based on the reflected sound signals received by the microphones;
   analyzing the behavior-induced acoustic pattern to determine a behavior of the driver or the passenger of the vehicle; and
   generating an alert according to the behavior of the driver or the passenger of the vehicle in view of a set of one or more rules.

11. The machine-readable medium of claim 10, wherein the sound signals comprise ultrasound signals.

12. The machine-readable medium of claim 10, wherein the one or more microphones are disposed at an upper front left corner, an upper front right corner, between a driver seat and a front passenger seat, a back of the driver seat or the front passenger seat, or between two back passenger seats in the vehicle.

13. The machine-readable medium of claim 10, wherein analyzing the behavior-induced acoustic pattern to determine a behavior of the driver or the passenger of the vehicle comprises matching the behavior-induced acoustic pattern with a list of predetermined acoustic patterns representing a list of predetermined behaviors.

14. The machine-readable medium of claim 10, wherein detecting a behavior-induced acoustic pattern based on the reflected sound signals includes extracting a power spectrogram based on the sound signals.

15. The machine-readable medium of claim 14, wherein analyzing the behavior-induced acoustic pattern to determine a behavior of the driver or the passenger of the vehicle comprises comparing the power spectrogram with a predetermined power spectrogram associated with a particular behavior.

16. The machine-readable medium of claim 10, wherein the operations further comprise determining a risk level of the behavior of the driver or the passenger, and wherein the alert is further generated based on the risk level of the behavior of the driver or the passenger.

17. The machine-readable medium of claim 16, wherein generating the alert according to the risk level of the driver or the passenger includes, when the behavior is from the driver,
   generating an alarm and activating an automatic driving mode to slow down to stop at a road side in response to the risk level being higher than a predetermined risk threshold.

18. The machine-readable medium of claim 16, wherein generating the alert according to the risk level of the driver or the passenger includes, when the behavior is from the passenger and the vehicle is in an autonomous driving mode, reducing a speed of the vehicle or switching to a comfort driving mode of the autonomous driving mode.

19. A data processing system, comprising:
   a processor; and
   a memory coupled to the processor to store instructions, which when executed by the processor, cause the processor to perform operations of operating a vehicle, the operations including
      generating sound signals using one or more speakers disposed within the vehicle, wherein the sound signals are not audible,
      receiving reflected sound signals from a driver or a passenger of the vehicle by one or more microphones disposed within the vehicle,
      detecting a behavior-induced acoustic pattern based on the reflected sound signals received by the microphones,
      analyzing the behavior-induced acoustic pattern to determine a behavior of the driver or the passenger of the vehicle, and
      generating an alert according to the behavior of the driver or the passenger of the vehicle in view of a set of one or more rules.

20. The system of claim 19, wherein the sound signals comprise ultrasound signals.

* * * * *